United States Patent [19]

Nishiki et al.

[11] Patent Number: 5,307,189
[45] Date of Patent: Apr. 26, 1994

[54] ACTIVE-MATRIX-ADDRESSED LIQUID CRYSTAL WITH CONDUCTOR COLLECTING LINES OF FORCE EMANATING FROM DATA ELECTRODE

[75] Inventors: Akihiko Nishiki; Shigeki Ogura; Kayo Yoshizawa; Tsutomu Nomoto, all of Tokyo, Japan

[73] Assignee: Oki Electric Industry Co., Ltd., Tokyo, Japan

[21] Appl. No.: 845,683

[22] Filed: Mar. 4, 1992

[30] Foreign Application Priority Data

Mar. 5, 1991 [JP] Japan .................................. 3-037652
Mar. 28, 1991 [JP] Japan .................................. 3-064584

[51] Int. Cl.⁵ .......................................... G02F 1/1343
[52] U.S. Cl. ...................................... 359/59; 359/87; 359/54; 359/67
[58] Field of Search ....................... 359/54, 55, 56, 57, 359/58, 59, 87, 89, 67

[56] References Cited

U.S. PATENT DOCUMENTS

| | | | |
|---|---|---|---|
| 4,470,667 | 9/1984 | Okubo et al. | 359/67 |
| 4,568,149 | 2/1986 | Sugata et al. | 359/67 |
| 4,687,298 | 8/1987 | Aoki et al. | 359/59 |
| 4,869,576 | 9/1989 | Aoki et al. | 359/68 |
| 4,973,135 | 11/1990 | Okada et al. | 359/56 |
| 5,084,778 | 1/1992 | DeJule et al. | 359/87 |

FOREIGN PATENT DOCUMENTS 0120321 6/1985 Japan .
0200324 9/1987 Japan .
0038263 10/1990 Japan .

OTHER PUBLICATIONS

A. Lien, "Two-Dimensional Simulation of the Lateral Field Effect of a 90 TN LCD Cell" *I.D.R.C. Eurodisplay '90 Digest*, pp. 248-251.
T. Onozawa, "Influences on Director Alignment of the Lateral Bus-Line Field in an Active-Matrix-Addressed Liquid Crystal Display" *Japanese Journal of Applied Physics*, vol. 29, No. 10 (1990) pp. L1853-L1855.
E. Takahashi et al. "Alignment Control for TFT-LCD" *The 16th Liq. Cryst. Symp. Digest*, pp. 212-213 (1990).

*Primary Examiner*—Stuart S. Levy
*Assistant Examiner*—Kenneth Parker
*Attorney, Agent, or Firm*—Edward D. Manzo; Dean A. Monco

[57] ABSTRACT

An active-matrix-addressed liquid crystal display includes an active-matrix substrate and an opposing electrode substrate on which opposing electrodes are formed. The opposing electrodes are formed into a combination of stripe electrodes each for collecting an electric field originating from the associated data line conductor, and display electrodes each corresponding to the associated pixel electrode. The stripe electrodes are connected with the associated display electrodes outside display areas. There are provided on the opposing electrode substrate a black mask formed of a photosensitive resin in which pigment of black is dispersed. The opposing electrodes may also be formed in an assembly of stripe electrodes each correspondingly to the associated pixel electrodes, no opposing electrode being disposed above the data line conductor.

11 Claims, 11 Drawing Sheets

EFFECTIVE VOLTAGE RATIO
ON DATA BUS TO MAXIMUM (%)

ACTIVE-MATRIX-ADDRESSED LIQUID CRYSTAL WITH CONDUCTOR COLLECTING LINES OF FORCE EMANATING FROM DATA ELECTRODE

BACKGROUND OF THE INVENTION

1. Field of the Invention

The present invention relates to a liquid crystal display, and more particularly to an active-matrix-addressed liquid crystal display using a thin film transistor (TFT).

2. Description of the Prior Art

An up-to-date active-matrix-addressed liquid crystal display has been greatly improved, and actively applied to a processor system such as a laptop personal computer in view of aspects such as high quality and pixel density of an image.

The active-matrix-addressed liquid crystal display includes an active-matrix substrate and an opposing electrode substrate. There are formed an array of drive elements such as thin film transistors (TFTs) on the active-matrix substrate, and opposing electrodes over the display area on the opposing electrode substrate, respectively.

FIG. 13 is a plan view of a conventional active-matrix substrate, and FIG. 14 is a sectional view taken along the line A—A of FIG. 13. In FIGS. 13 and 14, reference numeral 1 denotes a glass substrate; 3 a data line conductor; 4 a gate bus strip; 5 a thin film transistor; 6 a pixel electrode; 7 a passivation layer; and 10 an alignment film.

FIG. 15 is a plan view of a conventional opposing electrode substrate, and FIG. 16 is a opposing electrode substrate, and FIG. 16 is a sectional view taken along the line A—A of FIG. 15. In FIG. 15, the figures or contours defined by generally rectanglar shapes 8a are representative of openings of black mask 8. In FIG. 16, reference numeral 2 denotes a glass substrate. There are formed on one of the major surfaces of the glass substrate 2 the black mask 8 comprising a thin film of a metal such as chromium (Cr), and over the display area an opposing electrode 9 comprising ITO (Indium Tin Oxide) and alignment film 12, respectively.

The active-matrix-addressed liquid crystal display comprises an assembly of those two substrates in their combination in which a liquid crystal is contained in a space 14 formed between the two substrates.

FIG. 17 is a plan view of a conventional active-matrix-addressed liquid crystal display, and FIG. 18 is a sectional view taken along the line A—A of FIG. 17. As can be seen from FIGS. 17 and 18, wiring areas of the data line conductors 3 and the gate bus strips 4, and areas of the thin film transistors 5 on the active-matrix substrate 1 are optically shaded by the black masks 8 on the opposing electrode substrate 2.

There are two objects of providing the black masks 8, one of which is to shade the thin film transistor channel area so as to suppress a photoelectric effect due to incident light from the side of the opposing electrode substrate. The other object is, as described in references: (1) A. Lien, "Two-Dimensional Simulation of the Lateral Field Effect of a 90° TN LCD Cell" I. D. R. C. Eurodisplay '90 Digest, pp. 248–251; (2) T. Onozawa, "Influences on Director Alignment of the Lateral Bus-Line Field in an Active-Matrix-Addressed Liquid Crystal Display" Japanese Journal of Applied Physics, Vol. 29, No. 10 (1990) pp. L1853–L1855; (3) E. Takahashi, et al, "Alignment Control for TFT-LCD" The 16th Liq. Cryst. Symp. Digest, pp. 212–213 (1990); and (4) Japanese Utility Model Publication No. 38263/1990, to shade the areas or portions, depicted with the hatchings in FIGS. 17 and 18, in which areas liquid crystal molecules are activated in response to the electric field established between the data line conductors 3 and gate bus strips 4, and the opposing electrodes 9. For instance, in the case of a twisted nematic liquid crystal display (TN-LCD), transmissivity of such areas cannot be controlled. Thus, if such areas are not shaded by the black masks, then a quality of display will be degenerated because of a lower contrast ratio.

Now, it will be described more in detail hereinafter how the liquid crystal molecules are activated in response to the irregular electric field between the data line conductors 3, gate bus strips 4, pixel electrodes 6 and the opposing electrodes 9. FIG. 19 is a view showing the distribution of lines of electric force set up between each two of the data line conductors 3, the pixel electrodes 6 and the opposing electrodes 9 in the conventional active-matrix-addressed liquid crystal display. FIG. 20 is a view showing the distribution of lines of electric force established between each two of the gate bus strips 4, the pixel electrodes 6 and the opposing electrodes 9 in the conventional active-matrix-addressed liquid crystal display.

As shown in FIG. 19, lines of electric force start from the data line conductor 3 and reach the opposing electrode 9 and the pixel electrodes 6. Particularly, a shorter distance between the data line conductor 3 and the opposing electrode 9 induces a stronger electric field therebetween, and thus transverse components of the electric field have more effects on the liquid crystal molecules. As a result, an optical leakage may be caused by irregular action of the liquid crystal molecules in the regions above the opposite, elongated sides of the data line conductors 3, and/or a disclination line may be caused by a reverse tilt on the pixel electrodes 6. This is similar also as to the matter of the gate bus strip 4 shown in FIG. 20.

According to the references (1) and (2) noted above, an electric field distribution is obtained by means of a simulation so as to locate the disclination. Further, according to the reference (3), it is obtained by an experience that such a phenomenon is involved in a tilt angle.

However, these prior art documents fail to disclose specific countermeasures against the drawbacks mentioned above. Particularly, the countermeasures disclosed in the reference (4) are disadvantageous in that a viewing angle at which the lightest view is available is apt to be varied. Further, in order to suppress the above-mentioned drawbacks even with the liquid crystal display device with a larger viewing angle available, in other words, in order to obtain a display device with a wider viewing range with high contrast in an oblique direction with respect to the display screen, the black mask 8 is required to extend over portions of the pixel electrodes 6. According to the references (1) and (2), the extending portions were required to be in the order of at least 20 μm. However, the ratio of apertures to the whole area, or aperture ratio, of the black mask 8 is smaller with the higher pixel density of the liquid crystal display. Therefore, there was such a problem that although the extended portions of the black mask 8 are preferably smaller, they were not accomplished.

In addition, since the reverse tilt disclination line 11, FIG. 21, appears due to the electric field distribution set up between either two of the data line conductors 3, the gate bus strips 4, the pixel electrodes 6 and the opposing electrodes 9, invading into the effective pixel areas at a corner of the pixel electrodes 6, it extends into the aperture from the extending portions of the black mask 8, and thus it will be a cause of the degradation in a quality of display. If these areas are shaded with the black masks, the effect of the disclination can be eliminated. However, there remains such a problem that a brightness of an image displayed is lower owing to a further decreased aperture ratio of the black mask area.

SUMMARY OF THE INVENTION

It is therefore an object of the invention to provide an improved active-matrix-addressed liquid crystal display in accordance with which the foregoing problems can be solved.

It is another object of the invention to provide an active-matrix-addressed liquid crystal display in which a higher ratio of pixel apertures to the whole black mask area is established without damaging a higher display quality.

In accordance with a preferred embodiment of the invention, there is disclosed an active-matrix-addressed liquid crystal display comprising: an active-matrix substrate having data line conductors and an array of pixel electrodes formed thereon; an opposing electrode substrate having opposing electrodes formed thereon; and a liquid crystal secured in a space formed between said active-matrix substrate and said opposing electrode substrate; each of said opposing electrodes being formed in an assembly of a stripe electrode for collecting lines of electric force emanating from associated one of said data line conductors and a display electrode provided correspondingly to associated ones of said pixel electrodes, said stripe electrodes being connected to associated ones of said display electrodes.

In accordance with another embodiment of the invention, there is disclosed an active-matrix-addressed liquid crystal display comprising: an active-matrix substrate having data line conductors and an array of pixel electrodes formed thereon; an opposing electrode substrate having an array of opposing electrodes formed thereon; and a liquid crystal secured in a space formed between said active-matrix substrate and said opposing electrode substrate; each of said opposing electrodes being formed in an assembly of a stripe electrode for collecting line of electric force emanating from associated one of said data line conductors and a display electrode provided correspondingly to, and having substantially the same lateral shape as that of, said pixel electrodes, said stripe electrodes being connected to associated ones of said display electrodes.

In accordance with a further embodiment of the invention, there is disclosed an active-matrix-addressed liquid crystal display comprising: an active-matrix substrate having data line conductors and an array of pixel electrodes formed thereon; an opposing electrode substrate having opposing electrodes formed thereon; and a liquid crystal secured in a space formed between said active-matrix substrate and said opposing electrode substrate; said opposing electrodes being formed in an assembly of stripe electrodes each provided into a stripe-like shape correspondingly to associated ones of said pixel electrodes without extending over said data line conductors.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

First Illustrative Embodiment

Figure 1:
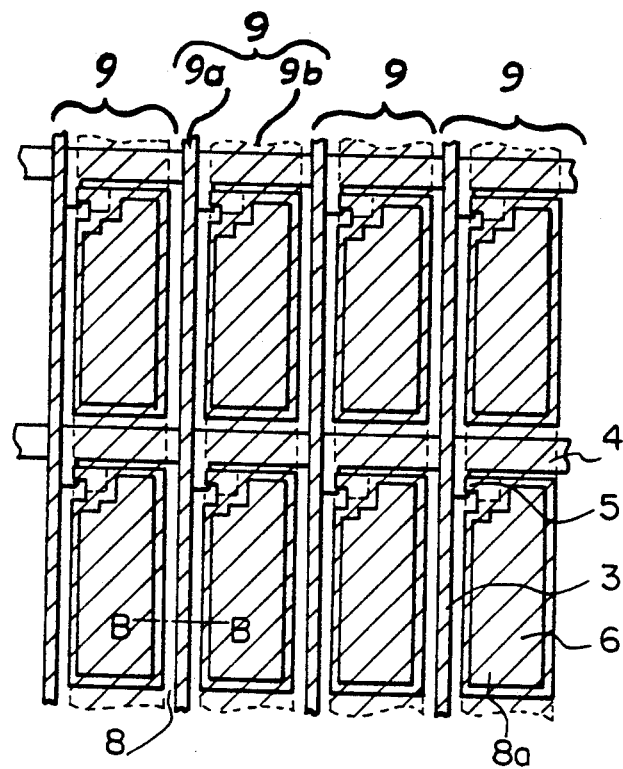
FIG. 1 is a partial plan view of an active-matrix-addressed liquid crystal display according to a first illustrative embodiment of the present invention.
Figure 2:
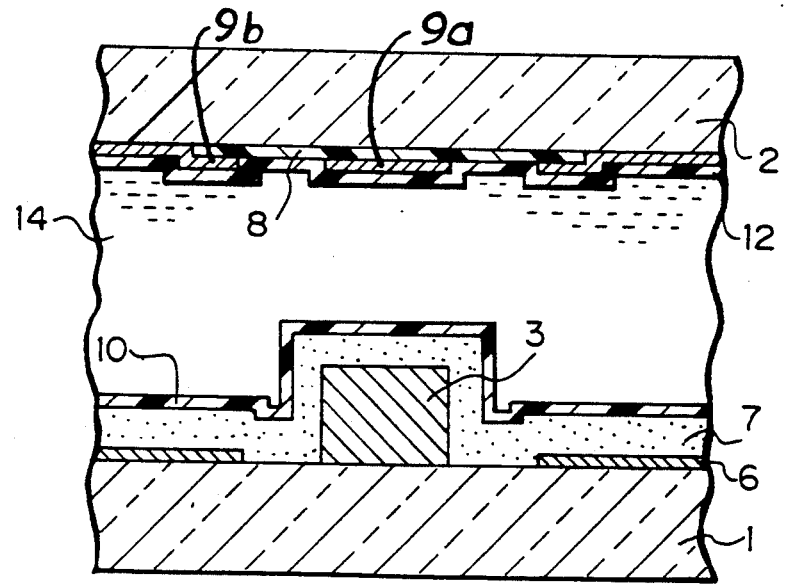
FIG. 2 is a partially sectional view of the liquid crystal display viewed along the line B—B in FIG. 1.

Referring to FIG. 1, a schematic, partial plan view of an illustrative embodiment of an active-matrix-addressed liquid crystal display device according to the present invention, and FIG. 2, a partially sectional view taken along the line B—B of FIG. 1, the display device includes a substantially flat glass plate or substrate 1, data line conductors 3 formed on one of the major surfaces of the substrate 1, gate bus strips 4, thin film transistors 5, pixel electrodes 6 on the major surface of the glass substrate 1, a passivation layer 7 formed thereon, and an alignment film 10 covering the structure to form an active-matrix substrate. The thin film transistors 5 are formed on the active-matrix substrate into an array of driver devices. Each of the transistors 5 is operably connected to the associated pixel electrode 6 to drive the pixel electrode 6 in response to a signal conveyed on the associated data line 3 while the associated gate bus strip 4 is enabled. In the figures, the components or structural elements similar to ones included in the prior art described above are designated by like reference numerals and redundant description will be avoided for simplicity.

As more clearly seen in FIG. 2, the display device also includes an additional glass plate or substrate 2, which is substantially flat and transparent, and of which on one of the major surfaces formed is a black mask 8. In FIG. 1, the figures or contours defined by generally rectangular shapes 8a represent openings formed in the black mask 8. Over display areas defined by those openings 8a, are opposing electrodes 9, which will later be described in detail. Those structures, opposite to the glass plate 2, are covered with an alignment film 12.

One of the important aspects of the present embodiment resides in configurations of opposing electrodes 9 constituting an opposing electrode substrate, and materials of the black mask 8. In the illustrative embodiment, each of the opposing electrodes 9, depicted with hatching in FIG. 1, includes a combination of stripe electrodes 9a each disposed substantially in parallel with an associated data line conductor 3 and having substantially the same width as that of the data line conductor 3, and display electrodes 9b each having a stripe-like shape that is substantially equal in width, or lateral length in FIG. 1, to the pixel electrode 6. The display electrodes 9b are connected with the associated stripe electrodes 9a outside the display areas 8a. All the stripe electrodes 9a are electrically connected with each other outside the display areas 8a. Opposing electrodes 9 may comprise ITO (Indium Tin Oxide), and be formed by a well-known photolithographic etching process. The black mask 8 is formed with photosensitive resin, available from Fuji Hunt Co., Ltd., Japan, for example, in which particles of black pigment are dispersed. The remaining elements may substantially be the same as the corresponding ones shown and described above in respect of the prior art.

The active-matrix-addressed liquid crystal display comprises an assembly of those two substrates 1 and 2, which are supported by a supporting member, not shown, with a space 14 secured between the two alignment films 10 and 12 formed on the major surfaces of the substrates 1 and 2, respectively. In the space 14, a liquid crystal is contained.

There is provided a TN (twisted nematic) type NB (normally black) mode of liquid crystal display device including the opposing electrode substrate thus prepared and an active-matrix substrate which may be conventional with a spacing between both of the substrates of a display cell, or a display cell gap, of 5 $\mu$m, the data line conductor 3 of 1 $\mu$m thick and 8 $\mu$m wide, a distance between the data line conductor 3 and the pixel electrode 6 of 10 $\mu$m, and a distance between the gate bus strip 4 and the pixel electrode 6 of 10 $\mu$m. In the embodiment, the black mask 8 extends over part of the pixel electrodes 6 by a lateral (in the figures) length of 5 $\mu$m.

Second Illustrative Embodiment

Figure 3:
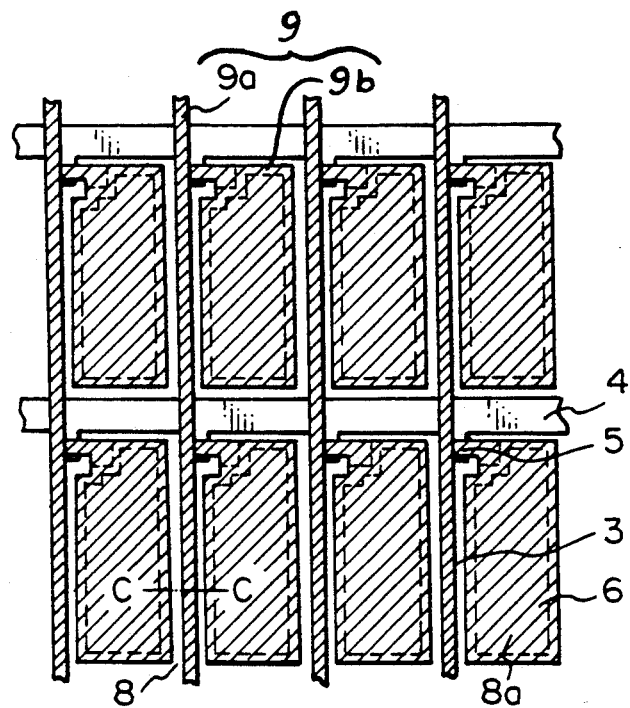
FIG. 3 is a partial plan view, similar to FIG. 1, of an active-matrix-addressed liquid crystal display according to a second illustrative embodiment of the invention.
Figure 4:
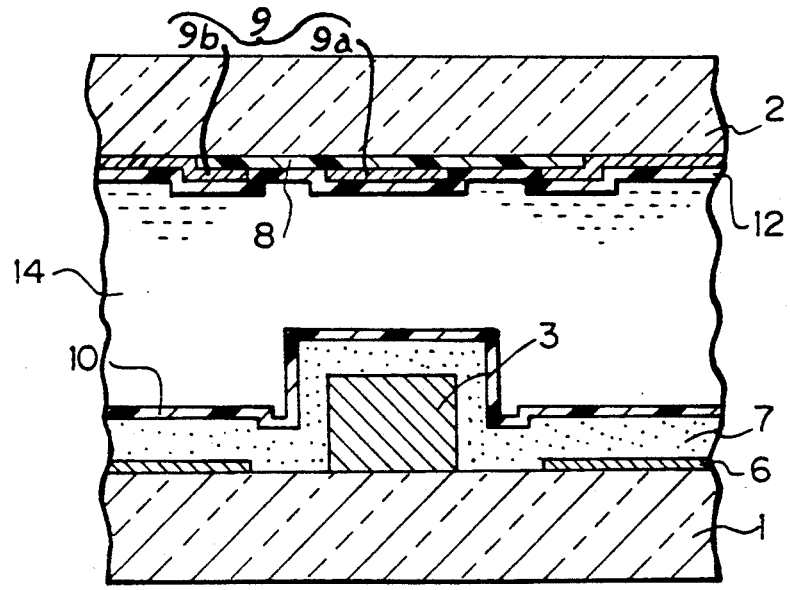
FIG. 4 is a partially sectional view of the liquid crystal display viewed along the line C—C in FIG. 3.

With reference to FIG. 3, showing an alternative embodiment of an active-matrix-addressed liquid crystal display according to the invention, and FIG. 4, showing in a partially sectional view taken along the line C—C in FIG. 3, main differences of the alternative embodiment from the first embodiment are in a configuration of the opposing electrodes 9 functioning as the opposing electrode substrate. The opposing electrodes 9 will therefore be described in detail hereafter. In the figures, like elements are designated with the same reference numerals as those in FIGS. 1 and 2.

According to the present embodiment, each of the opposing electrodes 9, depicted in FIG. 3 with the hatching also, comprises a combination of stripe electrodes 9a each disposed substantially in parallel with the associated data line conductor 3 and being substantially the same in width as the data line conductor 3, and display electrodes 9b each having substantially the same bidimentional or lateral shape or contour as that of the associated pixel electrode 6. In other words, the display electrodes 9b are of a generally rectangular or island-like shape which may substantially be identical to the pixel electrodes 6. The display electrodes 9b are connected with the associated stripe electrodes 9a outside the display areas 8a. All the stripe electrodes are also electrically connected with each other outside the display areas. The opposing electrodes 9 may be manufactured by the same process as the first embodiment. The black masks 8 may also be made of the same material as the first embodiment.

There is also provided a TN type NB mode of liquid crystal display using that opposing electrode substrate and the active-matrix substrate which may be conventional, where the dimensions such as a cell gap may be the same as in the first embodiment.

Figure 5:
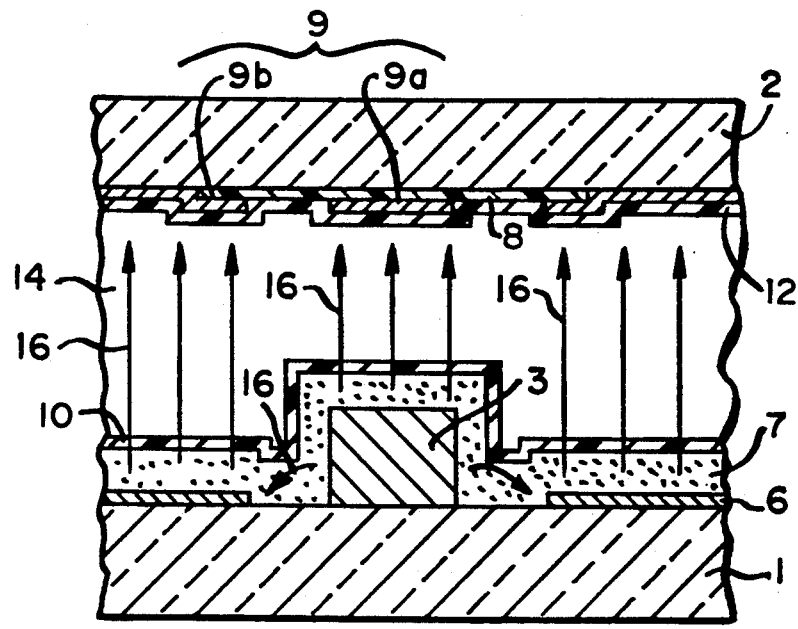
FIG. 5 is a view schematically showing the distribution of lines of electric force established between each two of the data line conductor, the pixel electrodes and the opposing electrode in the liquid crystal display according to the first and second illustrative embodiments.

FIG. 5 schematically shows the distribution of lines of electric force 16 established between each two of the data line conductor 3, the pixel electrodes 6 and the opposing electrode 9 in the first and second illustrative embodiments of the liquid crystal display device. In addition, FIG. 6 also schematically shows the distribution of lines of electric force 18 appearing between each two of the gate bus strip 4, the pixel electrodes 6 and the opposing electrode 9 in the second embodiment of the liquid crystal display device.

According to the illustrative embodiments shown and described above, the black mask 8 is made of an electrically insulative material such as resin. In addition, each of the stripe electrodes 9a is disposed above the associated data line conductor 3 to collect almost all or substantially all of the lines of electric force emanating from the associated data line conductor 3. The display electrodes 9b, which are substantially equal in width in the first embodiment or in lateral shape in the second embodiment as the associated pixel electrodes 6, are provided above the associated pixel electrodes 6. Therefore, as clearly understood from FIG. 5, the electric field intensity is decreased in the regions above the opposite, elongated edges of the data line conductor 3, thus resulting in the reduced effects of the lateral electric field on the liquid crystal molecules contained in the space 14 formed between both of the alignment layers 10 and 12 in comparison with the prior art device.

Figure 6:
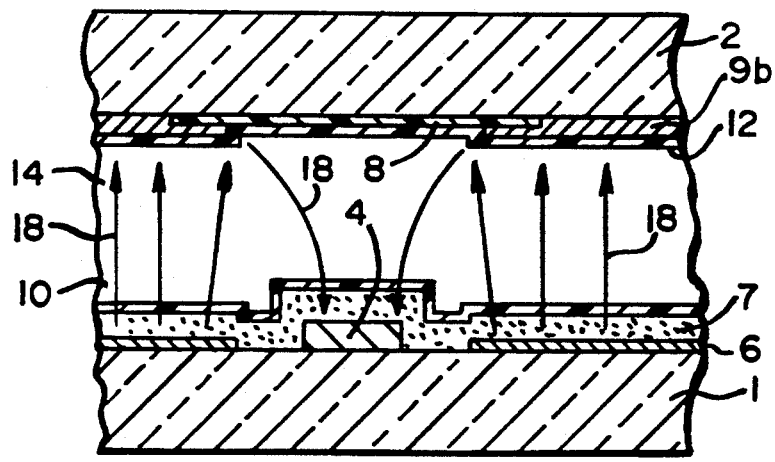
FIG. 6 also schematically shows the distribution of lines of electric force between each two of the gate bus strip, the pixel electrodes and the opposing electrode in the liquid crystal display according to the second illustrative embodiment.

Further, according to the second embodiment, no opposing electrodes 9 are disposed above the gate bus strips 4. Thus, as shown in FIG. 6, the lateral electric field intensity is decreased also in the regions above the opposite sides of the gate bus strips 4.

As a result, there does not occur the disclination due to the reverse tilt in the effective pixel areas 8a. It is noted that those effects are stronger with the larger number of thin film transistors 5 interconnected to one data line conductor 3 and turned on at a time.

Figure 7:
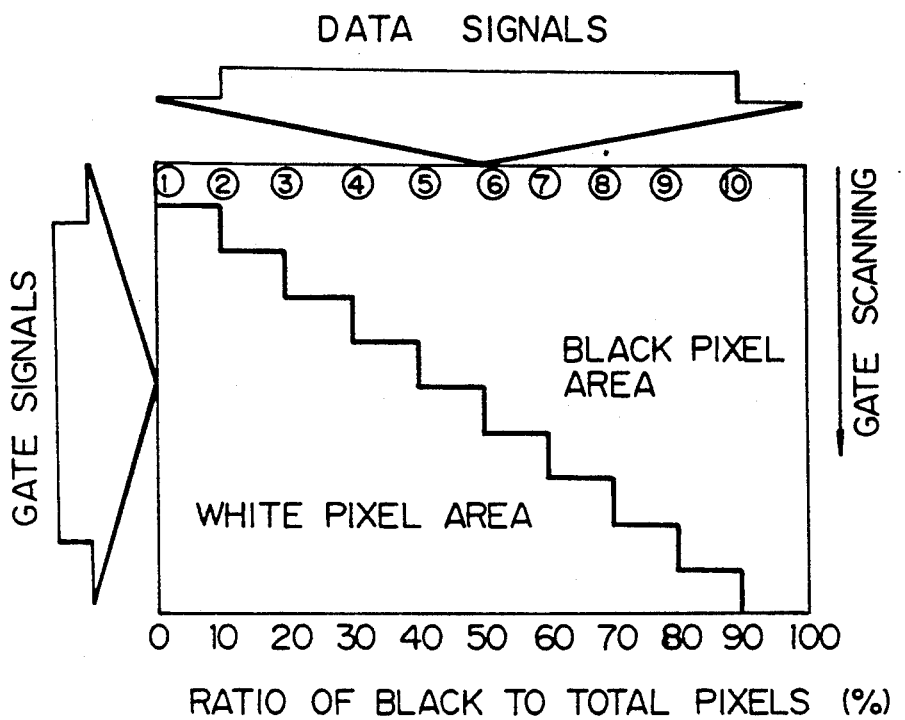
FIG. 7 is a diagram useful for understanding how to measure display characteristics of an active-matrix-addressed liquid crystal display.
Figure 8:
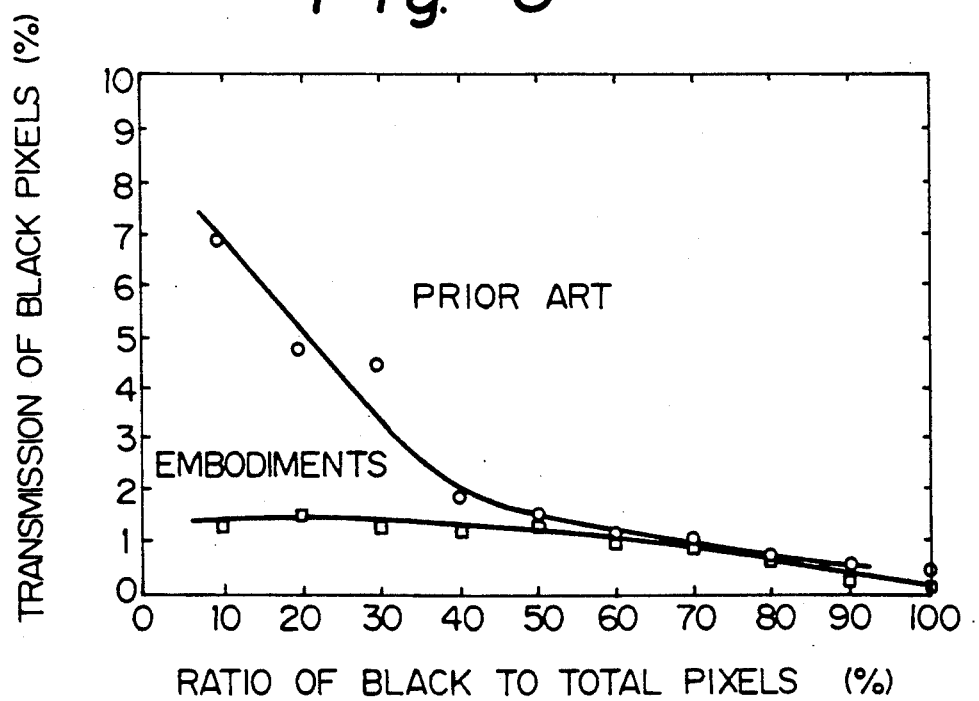
FIG. 8 plots display characteristics of the active-matrix-addressed liquid crystal displays according to the illustrative embodiments and the prior art.

FIGS. 7 and 8 show how to measure display characteristics of an active-matrix-addressed liquid crystal display, and results of display characteristics from the measurement with respect to the illustrative embodiments and a prior art example in which the NB mode is employed without black mask. Now, as seen in FIG. 7, the display area or screen of an active-matrix-addressed liquid crystal display in question is divided into ten subsections in the horizontal direction which are elongated in the vertical direction. There is provided a measuring point in each of those subsections which is designated with one of numerals 1-10 in circles and ordered in the transverse or lateral direction in the figure. Data signals are applied to the data lines such that each of the data signals for those subsections includes black and white pixels with the ratio of black to total pixels differring stepwise from adjacent subsections by 10% with gate signals applied to the gate buses.

From FIG. 8, it is understood that according to the prior art the optical transmissivity of black pixels is higher with the lower ratio of black to total pixels. The transmissivity of black, thus enhanced, brings degradation of the contrast of the displayed image. Thus, the prior art display device was designed such that the black mask extends over part of the pixel electrodes taking account of establishing a wide viewing angle and removing the effects from the disclination. On the contrary, according to the present embodiments, the rising of the optical transmissivity or leakage of black pixels is not remarkable, comparing with the prior art, even if the ratio of black to total pixels is lower. Therefore, it is possible to obtain a good display quality and an excellent viewing angle characteristic even if the black mask 8 does not extend over the pixel electrodes 6.

Third Illustrative Embodiment

Figure 9:
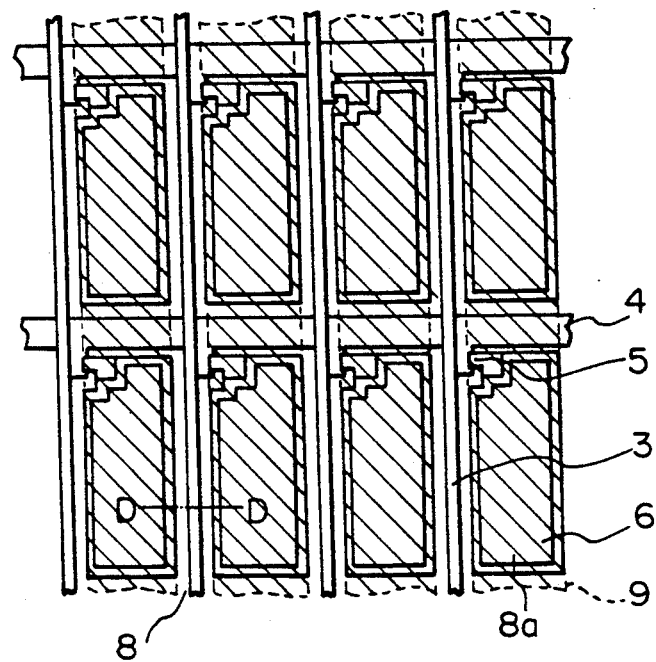
FIG. 9 is a plan view, similar to FIG. 1, of part of an active-matrix-addressed liquid crystal display according to a third illustrative embodiment of the invention.
Figure 10:
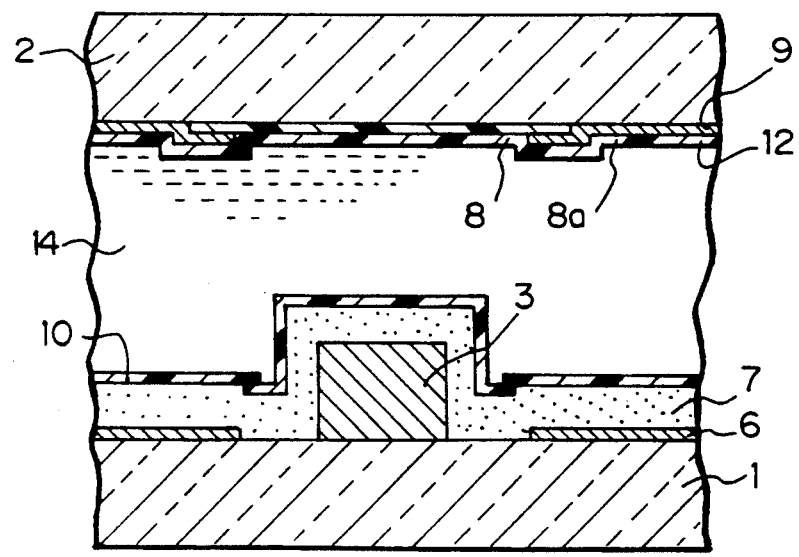
FIG. 10 is a partially sectional view of the liquid crystal display viewed along the line D—D in FIG. 9.

With reference to FIG. 9, which is a plan view of an active-matrix-addressed liquid crystal display according to a still alternative illustrative embodiment of the invention, and FIG. 10, which is a partially sectional view taken along the line D—D of FIG. 9, an aspect of the present embodiment resides in configurations of the opposing electrodes 9 in the opposing electrode substrate and the materials of the black mask 8.

According to the present embodiment, the opposing electrodes 9, depicted with the hatching in FIG. 9, are formed into an assembly of stripe electrodes, each of which is disposed substantially in parallel with the associated data line conductors 3 and has a stripe-like shape that is substantially equal in width to the pixel electrodes 6 to be disposed substantially over associated ones of the pixel electrodes 9. All the stripe electrodes 9 are electrically connected with each other outside the display areas 8a. Those opposing electrodes 9 are also formed by a well known photolithographic etching process in the instant embodiment. The black mask 8 is formed with a photosensitive resin which is described with reference to FIGS. 1 and 2.

There is also provided a TN type NB mode of liquid crystal display using the opposing electrode substrate and the active-matrix substrate which may be the same as a conventional substrate, where a cell pitch is 5 $\mu$m, the data line conductor 3 is 1 $\mu$m thick, the distance between the data line conductor 3 and the pixel electrode 6 is 10 $\mu$m, the distance between the gate bus strip 4 and the pixel electrode 6 is 10 $\mu$m, and the pixel electrodes 6 extend over parts of the black mask 8 by the lateral length of 5 $\mu$m.

Figure 11:
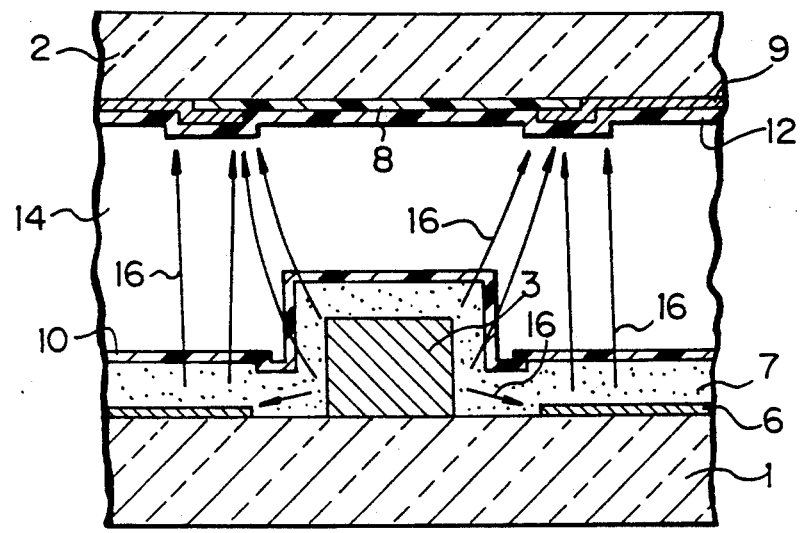
FIG. 11 schematically shows, similarly to FIG. 5, the distribution of lines of electric force between each two of the data line conductor, the pixel electrodes and the opposing electrode in the liquid crystal display according to the third illustrative embodiment.

FIG. 11 shows the distribution of lines of electric force 16 between each two of the data line conductor 3, the pixel electrodes 6 and the opposing electrode 9 in the liquid crystal display according to the third illustrative embodiment of the invention. According to the instant illustrative embodiment, the black mask 8 is formed with an electrically insulative material such as resin, and no opposing electrode is provided above the data line conductor 3. Thus, as shown in FIG. 11, the electrical field intensity is decreased in the regions above the opposite sides of the data line conductor 3, thereby also reducing an effect on the liquid crystal molecules in the space 14 in comparison with the prior art device.

Figure 12:
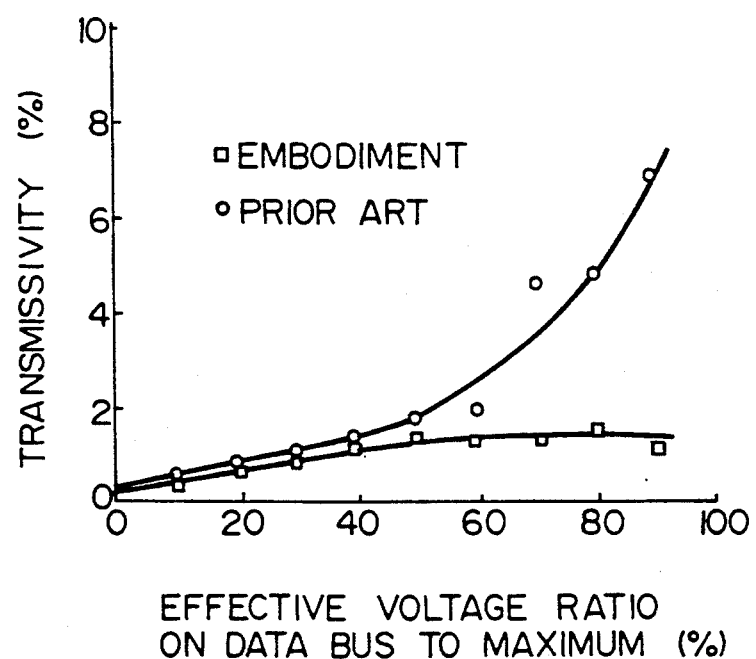
FIG. 12 plots characteristics of an optical leakage measured in the active-matrix-addressed liquid crystal displays according to the third illustrative embodiment and the prior art.
Figure 13:
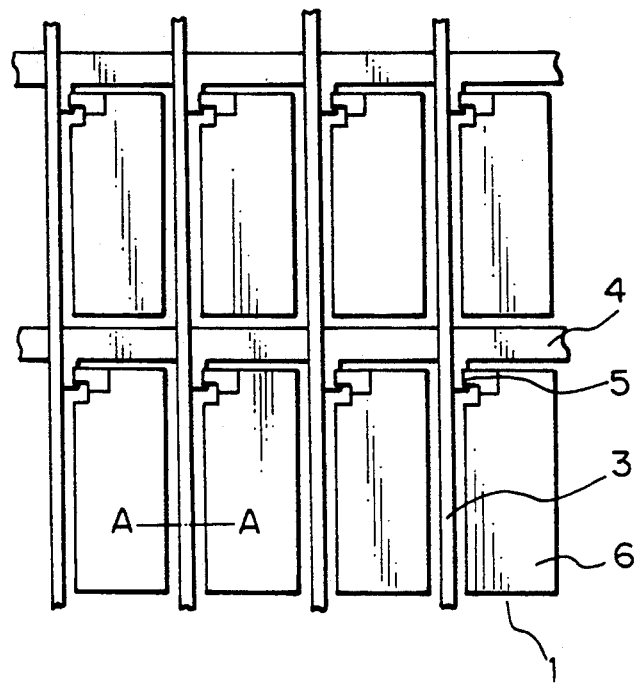
FIG. 13 is a partial plan view of a conventional active-matrix substrate.
Figure 14:
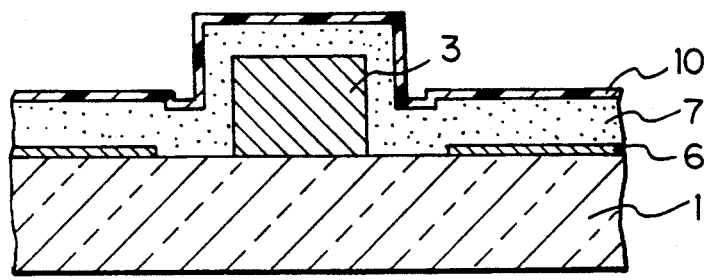
FIG. 14 is a partially sectional view of the conventional active-matrix substrate viewed along the line A—A in FIG. 13.
Figure 15:
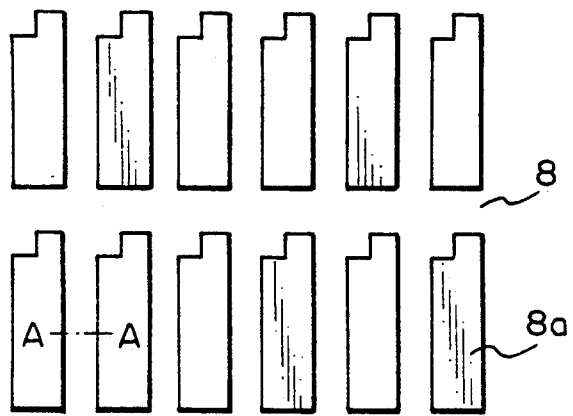
FIG. 15 is a partial plan view of a conventional opposing electrode substrate.
Figure 16:
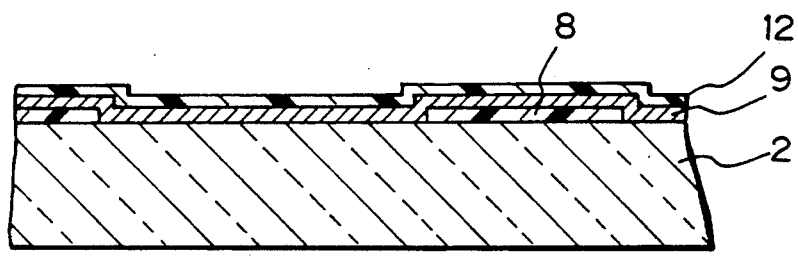
FIG. 16 is a partially sectional view of a conventional opposing electrode substrate.
Figure 17:
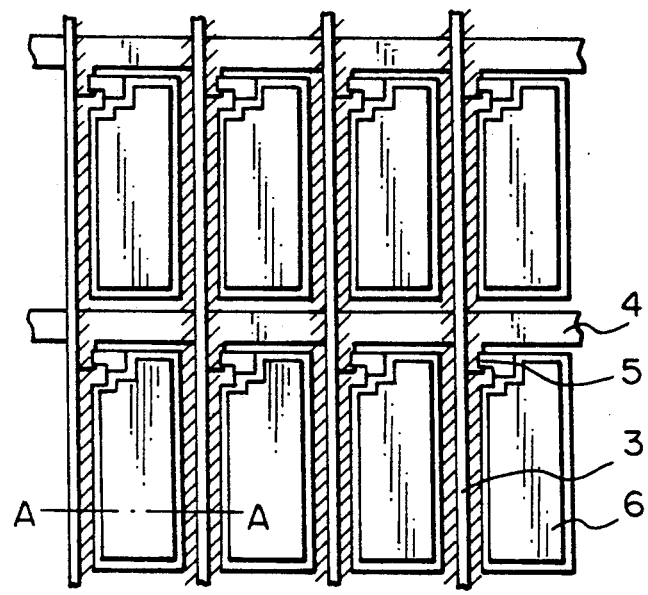
FIG. 17 is a partial plan view of the conventional active-matrix-addressed liquid crystal display assembled from the substrates shown in FIGS. 13 and 15.
Figure 18:
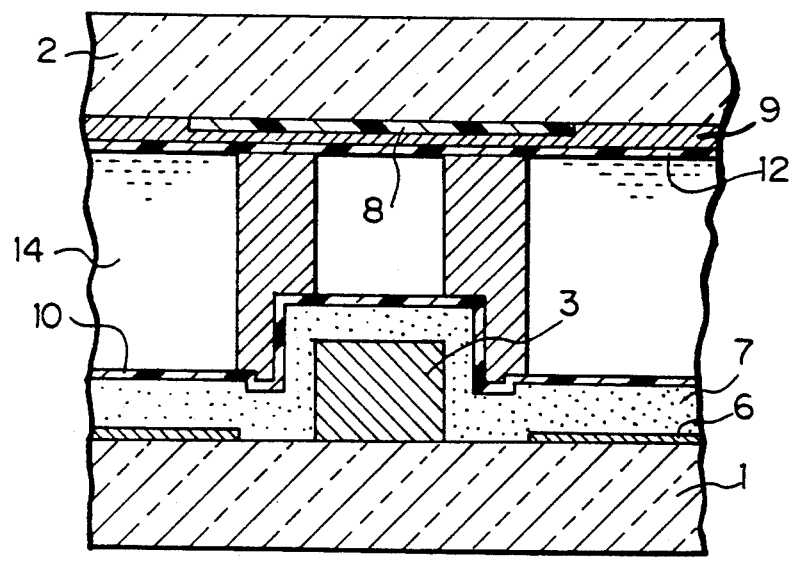
FIG. 18 is a partially sectional view of the conventional liquid crystal display cut along the line A—A shown in FIG. 17.
Figure 19:
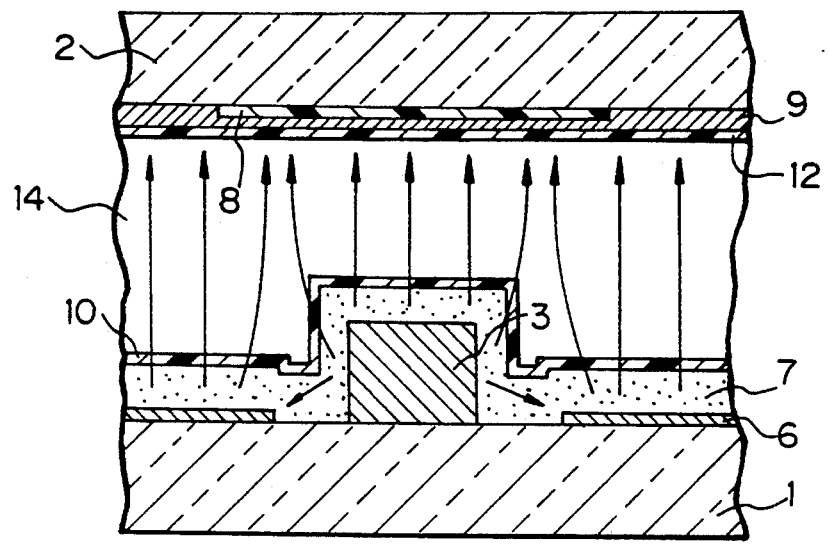
FIG. 19 is a view, similar to FIG. 5, showing the distribution of lines of electric force between each two of the data line conductor, the pixel electrodes and the opposing electrode in the conventional liquid crystal display shown in FIG. 17.
Figure 20:
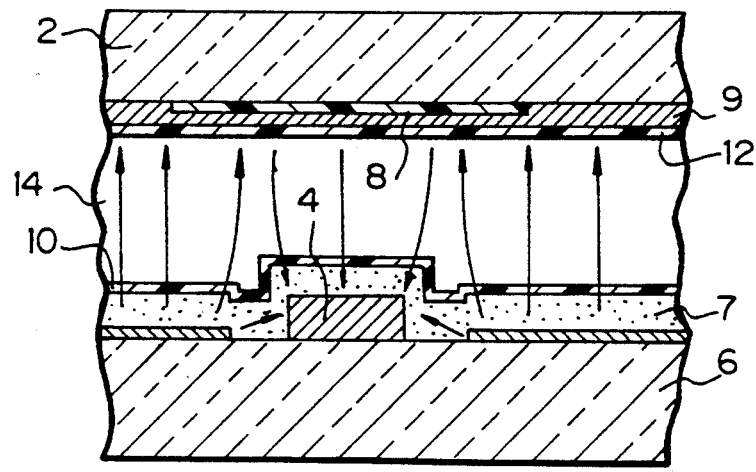
FIG. 20 shows, similarly to FIG. 6, the distribution of lines of electric force between each two of the gate bus strip, the pixel electrodes and the opposing electrode in the conventional liquid crystal display shown in FIG. 17.
Figure 21:
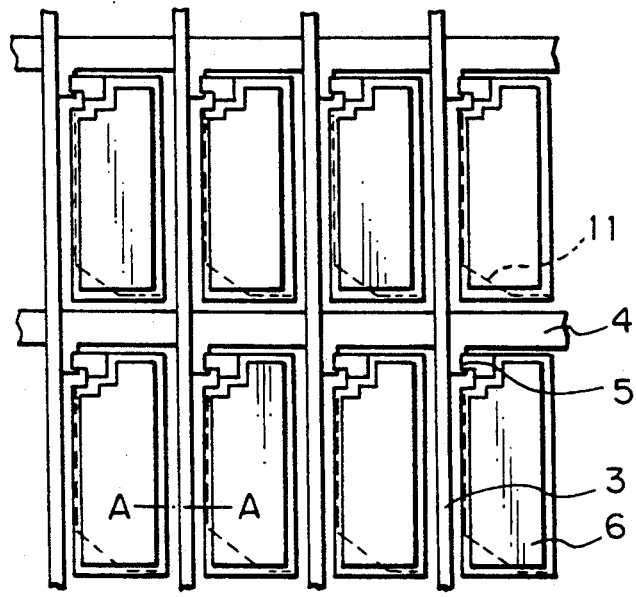
FIG. 21 is a diagram useful for understanding reverse tilt disclination lines in the conventional liquid crystal display shown in FIG. 17.

FIG. 12 also plots characteristics of optical leakage measured in the liquid crystal displays according to the third illustrative embodiment of the present invention and the prior art. As shown in the figure, according to the prior art, when an effective voltage of the data bus increases to exceed 60%, corresponding to its saturation voltage, the optical transmissivity or leakage abruptly increases. On the other hand, according to the present embodiment, the transmissivity remains substantially constant.

Further, according to the present embodiment, there does not occur the disclination due to the reverse tilt within the pixel areas 8a. It is also noted in this embodiment that this effect becomes stronger with the larger number of thin film transistors connected to one data line conductor 3 and turned on. Additionally, according to the present embodiment, it is also possible to obtain a good display quality and an excellent viewing angle characteristic even in the case of the black mask 8 not extending over the pixel electrodes 6.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

For example, according to the particular illustrative embodiments as described above, there is provided on the opposing electrode substrate the black mask formed with the insulation. However, if there is provided the configuration of the opposing electrode as accomplished in the first or second illustrative embodiments, even no provision of the black masks makes it possible to decrease the field intensity in the regions above the opposite, elongated edges or sides of data line conductors or the gate bus strips, thereby decreasing an effect on the liquid crystal molecules. Further, even such a simpler arrangement that no opposing electrode is disposed over the data line without providing the black mask makes it possible to decrease the field intensity in the regions above the opposite sides of data line conductors or the gate bus strips, thereby decreasing the effect on the liquid crystal molecules.

Further, according to the first and second illustrative embodiments, there is provided such an arrangement that the stripe and display electrodes 9a and 9b are substantially equal in width to the data line conductor 3 and the display electrode 9b, respectively. However, it is of course possible to provide modifications such as preselection of a slightly narrower stripe and display electrodes taking account of reducing misalignment between the active-matrix substrate and the opposing electrode substrate.

Furthermore, the particular illustrative embodiments as described above are directed to a monochromatic or black and white display has been described for the purpose of a simpler description. However, the present invention is applicable to a color display device including a color filter provided over the opposing electrode substrate, as depicted by a phantom line 20 in FIG. 2, to display a color picture. Also in the latter case, it is possible to expect the same effects or advantages as in the case of the monochromatic display.

What we claim is:

1. A twisted nematic type of active-matrix-addressed liquid crystal display comprising:
    an active-matrix substrate having data line conductors and an array of pixel electrodes formed thereon;
    an array of driver transistors provided on said active-matrix substrate, each of said driver transistors being operably connected to an associated one of said pixel electrodes to drive said associated pixel electrode;
    an opposing electrode substrate having opposing electrodes formed thereon; and
    a liquid crystal secured in a space formed between said active-matrix substrate and said opposing electrode substrate;
    each one of said opposing electrodes being formed in an assembly of a stripe electrode and a display electrode, said stripe electrode collecting lines of electric force emanating from an associated one of said data line conductors, and said display electrode being provided correspondingly to associated ones of said pixel electrodes, said stripe electrode being connected to an associated one of said display electrodes.

2. A display according to claim 1, wherein said stripe electrodes are disposed substantially parallel with said data line conductors and have substantially the same width as that of said data line conductors, and said display electrodes have substantially the same width as that of said pixel electrodes.

3. A display according to claim 2, wherein said stripe electrodes are electrically connected with each other outside display areas defined by said pixel electrodes.

4. A display according to claim 1, further comprising a black mask formed on said opposing electrode substrate and including a photosensitive resin in which pigment of black is dispersed.

5. A twisted nematic type of active-matrix-addressed liquid crystal display comprising:
    an active-matrix substrate having data line conductors and an array of pixel electrodes formed thereon;
    an array of driver transistors provided on said active-matrix substrate, each of said driver transistors being operably connected to an associated one of said pixel electrodes to drive said associated pixel electrode;
    an opposing electrode substrate having an array of opposing electrodes formed thereon; and
    a liquid crystal secured in a space formed between said active-matrix substrate and said opposing electrode substrate;
    each one of said opposing electrodes being formed in an assembly of a stripe electrode and plural display electrodes, said stripe electrode collecting lines of electric force emanating from an associated one of said data line conductors, and each one of said plural display electrodes being provided correspondingly to, and having substantially the same lateral shape as that of, an associated one of said pixel electrodes, said stripe electrode being connected to associated ones of said display electrodes.

6. A display according to claim 5, wherein said stripe electrodes are disposed substantially parallel with said data line conductors and have substantially the same width as that of said data line conductors.

7. A display according to claim 6, wherein said stripe electrodes are electrically connected with each other outside display areas defined by said display electrodes and said pixel electrodes.

8. A display according to claim 5, further comprising a black mask formed on said opposing electrode substrate and including a photosensitive resin in which pigment of black is dispersed.

9. A twisted nematic type of active-matrix-addressed liquid crystal display comprising:
    an active-matrix substrate having data line conductors and an array of pixel electrodes formed thereon;
    an array of driver transistors provided on said active-matrix substrate, each of said driver transistors being operably connected to an associated one of said pixel electrodes to drive said associated pixel electrode;
    an opposing electrode substrate having opposing electrodes formed thereon; and
    a liquid crystal secured in a space formed between said active-matrix substrate and said opposing electrode substrate;
    said opposing electrodes being formed in an assembly of stripe electrodes, each of which is provided into a stripe-like shape correspondingly to associated ones of said pixel electrodes without extending above said data line conductors, and wherein said stripe electrodes are electrically connected with each other outside display areas defined by said pixel electrodes.

10. A display according to claim 9, wherein said stripe electrodes are disposed substantially parallel with said data line conductors and have substantially the same width as that of said pixel electrodes.

11. A display according to claim 9, further comprising a black mask formed on said opposing electrode substrate and including a photosensitive resin in which pigment of black is dispersed.

* * * * *